United States Patent Office 3,801,636
Patented Apr. 2, 1974

3,801,636
3,4,5-TRI-SUBSTITUTED CINNAMIDES
Bruce Wayne Horrom, Waukegan, Ill., assignor to
Abbott Laboratories, North Chicago, Ill.
No Drawing. Filed Aug. 13, 1971, Ser. No. 171,737
Int. Cl. C07c 103/28
U.S. Cl. 260—558 A                    12 Claims

ABSTRACT OF THE DISCLOSURE

Covers compounds of the formula:

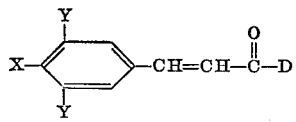

where X is selected from the group consisting fo $NH_2$, NH-loweralkyl and N(loweralkyl)$_2$; each Y is a halogen selected from the group consisting of chlorine, bromine, fluorine and iodine; and D is an organic radical containing a nitrogen atom; and pharmaceutically-acceptable addition salts thereof. Also covers their use as anti-depressant drugs. In addition covers various novel intermediates used in preparing the above compounds.

BACKGROUND OF THE INVENTION

Patients suffering from depression manifest one or more of a variety of symptoms. Generally speaking, depressed patients feel incapable of dealing with their responsibilities. The predominate symptoms of depression are hypochondria, anorxeria, insomnia, anergia, anhedonia, and pessimism. The present invention provides a group of novel compounds useful as anti-depressants, and additionally provides a method of treating depressed patients utilizing these compounds.

BRIEF SUMMARY OF INVENTION

The novel compounds of this invention are represented by the following structural formula:

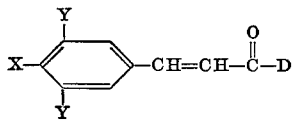

where X is selected from the group consisting of $NH_2$, NH-loweralkyl and N(loweralkyl)$_2$; each Y is a halogen selected from the group consisting of chlorine, bromine, fluorine and iodine; and D is an organic radical containing a nitrogen atom; and pharmaceutically-acceptable addition salts thereof.

More preferred compounds have the following formula:

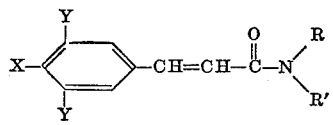

where X is selected from the group consisting of $NH_2$, NH-loweralkyl and N(loweralkyl)$_2$; each Y is a halogen selected from the group consisting of chlorine, bromine, fluorine and iodine; each R and R' are radicals selected from the group consisting of hydrogen, alkyl, aryl, cycloheteryl, alkaryl, aralkyl, and cycloalkyl; and R and R' when taken together with the accompanying nitrogen atom, represent a nitrogen heterocyclic radical; and pharmaceutically-acceptable addition salts thereof.

DETAILED DESCRIPTION OF THE INVENTION

The novel compounds of the invention may be prepared via a number of known techniques. By far the easiest procedure is the following.

The first step in the reaction sequence involves reacting an alkyl-4-amino benzoate or an alkyl-4-substituted amino benzoate, known classes of compounds, with an appropriate reagent to produce the 3,5-dihalo substituted derivatives thereof. For example, this can be done by reacting the starting known materials with sulfuryl chloride. The resulting intermediate compounds are believed to be a novel class of compounds and have the following formula:

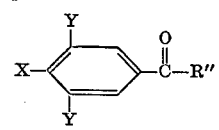

where X is selected from the group consisting of $NH_2$, NH-loweralkyl, and N(loweralkyl)$_2$, each Y is a halogen selected from the group consisting of chlorine, bromine, fluorine and iodine and R″ is a lower alkyl radical.

The next step here involves reaction of the above alkyl 3,5-dihalo-4-mono or di-substituted amino benzoates to produce the corresponding benzyl alcohol derivatives, also here thought to be novel. This is best carried out by reduction of the benzoate to the alcohol with a powerful reducing agent such as lithium aluminum anhydride. These derivatives useful in making the final compounds have the following structural formula:

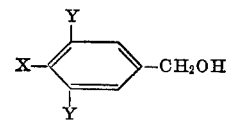

where X is selected from the group consisting of $NH_2$, NH-loweralkyl and N(loweralkyl) and each Y is a halogen selected from the group consisting of chlorine, bromine, fluorine and iodine.

The third step in the reaction sequence here involves formation of the aldehyde derivative of the above compounds. This may be accomplished in a number of ways. For example, the alcohol derivative may be treated with thionychloride to give the benzylchloride derivative. This derivative in turn may be treated via the classic Sommelet reaction with hexamethylene tetramine to yield the aldehyde. In yet another procedure the alcohol is directly oxidized with a mild oxidizing agent such as nitrogen oxide to yield the aldehyde derivative.

These novel intermediates then have the following general structural formula:

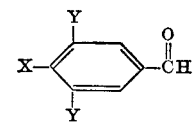

where X is selected from the group consisting of $NH_2$, NH-loweralkyl and N(loweralkyl)$_2$, and each Y is a halogen selected from the group consisting of chlorine, bromine, fluorine and iodine.

The next step is this reaction sequence involves formation of the desired substituted cinnamic acids by reacting the above aldehyde derivatives with malonic acid in a Perkin type reaction, using piperidine as a catalyst. This gives the following novel group of intermediate derivatives having the general structural formula as follows:

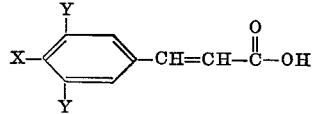

where X is selected from the group consisting of $NH_2$, NH-loweralkyl and N(loweralkyl)$_2$ and each Y is a halogen selected from the group consisting of chlorine, bromine, fluorine and iodine.

The last step here is to form the amide derivatives. In one procedure, the acid chloride is formed first by reaction of the above cinnamic acids with thionychloride prior to reaction with an amine. In still another process the acid chloride is made by reaction of the cinnamic acid with phosphorus pentachloride.

Wide varieties of amides may be formed by resort to reaction with diverse amines which react with the acid chloride derivatives of the above cinnamic acids. Such amines as 2-methyl-butynyl, N-propyl, cyclopropyl, cyclopropylmethyl, dimethylaminopropyl, methyl, dimethyl, diethyl, dodecyl, lauryl, oleyl, dilauryl, distearyl, octylmethyl, ethyl, diethyl, diisopropyl, aminoethyl, ethanol, diethanol, monoethano, monoisopropanol, etc. amines may be used as reactants. In addition such amines as morpholine, pyrrolidone, 5-methyl-2-oxazolidone, 2-oxazolidone, imidazole, 5-benzimidazole, 2-hydroxyethylimidazole, 2-methyl imidazole, pyrazine, pyridine, piperidine, cyclohexyl amine, 2-cyanomethyl-2-imidazoline and other amines may be utilized to form the desired cinnamide. Lastly, ammonia may also be used as an amine reactant here.

Most preferred amine reactants are ammonia, a monosubstituted or di-substituted amine or an amine heterocycle. In such event, the substituent upon the amine reactant defined as R or R' in case of an acyclic amine is one where the number of carbon atoms is 8 or less, more often 7 or less, whether the substituent is in a straight or branched chain configuration, saturated or unsaturated. Likewise when the amine reactant is an amine heterocycle or a cyclic amine containing no additional atoms other than carbon and hydrogen, the number of carbons in such case is preferably 8 or less, more often 7 or less. Thus, in any event, R or R' groups in addition to containing such atoms as oxygen, nitrogen, sulfur and halogen atoms will usually contain 8 carbons or less. Likewise a cyclic or heterocyclic amine compound which was a reactant in the final step here will normally contain 8 carbons or less so that R and R' when taken together with the accompanying nitrogen atom in a finally prepared compound will contain 8 or less carbon atoms in the moiety.

The novel compounds here are useful in treating depressed patients. The patients can be treated by administering the compounds orally or by injection. For the latter, solutions or suspensions may be prepared by slurrying 1–10% of the compound in water containing .01–2.0% of carboxymethylcellulose. Suspensions may also be prepared by using 0.50–0.5% tragacanth solutions. For oral administration, tablets, pills, capsules, etc. are easily prepared. Tablets may be prepared to contain between 5 and 50 mg., more often between 5 and 25 mg. of the active ingredient with the usual tableting adjuvants, e.g. coloring agents, flavoring agents, diluents, lubricants, carriers, and, if desired, dispersing agents or release retardants. The compounds may also be combined with other active drugs.

The anti-depressant agents disclosed here when administered to mammals such as humans are effective in a dosage range from about 0.1 to about 100 mg./kg. of body weight daily, either in single or divided dosages. More often the daily dosage range is 1–50 mg./kg.

This invention also includes salts of the above defined compounds having the basic group defined as X above and other amino groups, if present, formed with non-toxic organic acids. Such salts are easily prepared by methods known to the art. The base is reacted with either the calculated amount of organic or inorganic acid and aqueous miscible solvents, such as acetone or ethanol, with isolation of the salt by concentration and cooling or the base is reacted with an excess of the acid in aqueous immiscible solvents, such as ethyl ether, or chloroform, with the desired salts separating out directly. Exemplary of such organic salts are those formed with maleic, fumaric, benzoic, ascorbic, succinic, bismethylenesalicylic, methylsulfonic, ethanesulfonic, acetic, propionic, tartaric, salicylic, citric, glyconic, lactic, malic, aspartic, stearic, citraconic, palmitic, glycolic, glutamic, p-aminobenzoic, benzene sulfonic, cyclohexylsulfamic, and theophylline acetic acids etc. Exemplary of such inorganic salts are those formed with hydrochloric, hydrobromic, sulfuric, sulfamic, phosphoric, and nitric acids.

Of course, these salts may be prepared by the classical method of double decomposition of appropriate salts, which method is well known to the art. Also included within the purview of this invention are the non-toxic quaternary ammonium salts which include those formed with alkyl halides (e.g., methyl chloride, isobutyl bromide, dodecyl chloride, and cetyl iodide), benzyl halides (e.g., benzyl chloride) and dilower alkyl sulfates (e.g., dimethyl sulfate). These salts are likewise useful anti-depressants, if pharmaceutically acceptable.

The following examples illustrate typical intermediates and final compounds of the invention, and their method of preparation. It is understood, of course, that these examples are merely illustrative, and that the invention is not to be limited thereto.

EXAMPLE I

Methyl-3,4-dichloro-4-methylamino benzoate

Here, 66 grams (0.4 mole) of methyl-4-methylamino benzoate in 400 cc. of dry chloroform was heated to reflux with stirring and 109.4 grams (0.81 mole) of sulfuryl chloride was added drop-wise over a period of about 1 hour and 40 minutes. After addition was complete the reaction mixture was refluxed for 2 hours longer. At the end of this time the reaction mixture was allowed to cool and then washed successively with water, sodium bisulfite solution, potassium carbonate solution and lastly with water again. The chloroform was then removed and the yellow ester solidified. 92.3 grams (theo. 93.6 grams) was obtained and the product had a melting point of 72–74° C. When recrystallized from methanol it had a melting point of 76–77° C.

EXAMPLE II 3,4-dichloro-3-methylamino benzoic acid 80 grams (0.34 mole) of methyl-3,4-dichloro-4-methylamino benzoate (crude) was dissolved in 400 cc. of methanol and added to 156 grams of potassium hydroxide and 200 cc. water. The mixture was refluxed for 2 hours. The excess methanol was removed and the resulting potassium salt was taken up in water and thereafter the solution was made acidic with dilute hydrochloric acid. The resulting colorless solid was filtered and dried. 72.6 grams (96.5% yield) of product was obtained having a melting point of 193–195° C. Recrystallization of this material from a methanol-water mixture gave a pure product having a melting point of 196–197° C.

EXAMPLE III 3,4-dichloro-4-butylamino benzoic acid 44 grams (0.2 mole) of methyl-3,5-dichloro-4-amino benzoate in 50 cc. of dimethylformamide was added dropwise, while stirring over a 15 minute period to 5.24 grams (0.21 mole) of sodium hydride in 100 cc. of dimethylformamide while heating on a steam bath. After addition was complete the reaction mixture was heated 15 minutes additional time. The bath was removed and while the reaction mixture was still hot 28.77 grams (0.21 mole) of n-butyl bromide was added over a 15 minute period. After addition of the bromide was complete the reaction mixture was heated for 1 hour on a steam bath and allowed to stand for 4 hours. Thereafter it was heated for an additional hour. The reaction mixture was then concentrated under vacuum and benzene was added along with water. The benzene solution was then washed 3 times with water and concentrated. The resultant ester was an oil which was distilled to purify. The yield was approximately 92%.

The ester was then hydrolyzed. Specifically, 60 grams of ester (0.217 mole) in 200 cc. of methanol was hydrolyzed by addition of 78 grams of potassium hydroxide in 100 cc. of water. The resultant potassium salt was obtained in approximately in a 92% yield. The salt was then treated with hydrochloric acid to obtain the desired benzoic acid derivative.

EXAMPLE IV

3,5-dichloro-4-ethylamino benzyl alcohol

A solution of 248 grams (1 mole) of methyl 3,5-dichloro-4-ethylamino benzoate in 1400 ml. of anhydrous ether was added drop-wise to a vigorously stirred suspension of 37.9 grams (1 mole) of lithium aluminum hydride in 400 ml. of anhydrous ether at a rate which maintained gentle reflux. The reaction mixture was then cooled and successively treated dropwise with 38 ml. of water, 38 ml. of a 15% aqueous solution of sodium hydroxide, and finally with 114 ml. of water. The organic material was then filtered off. The filtrate was dried over sodium sulfate and concentrated under reduced pressure, leaving 214 grams of a syrup. Distillation of the syrup under reduced pressure gave 159 grams of the pure benzyl alcohol. The alcohol had a boiling point of 131° C. under a vacuum of 0.5 mm.

EXAMPLE V

3,5-dichloro-4-ethylamino benzaldehyde

A solution of 146 grams (1.22 mole) of thionylchloride in 200 ml. of methylene chloride was added dropwise to a stirred solution of 220 grams (1 mole) of 3,5-dichloro-4-ethylamino benzyl alcohol in 2 liters of methylene chloride previously cooled to 0° C. The reaction mixture was heated under reflux for one-half hour. After cooling, the solvent was evaporated under reduced pressure leaving a yellow semi-solid. Titration of the semi-solid with petroleum ether gave 266 grams of yellow, hygroscopic 3,5-dichloro-4-ethylaminobenzylchloride hydrochloride.

A mixture of 258 grams (.938 mole) of 3,5-dichloro-4-ethylamino benzylchloride hydrochloride, 407 grams (2.92 moles) of hexamethylenetetramine, 1.84 liters of acetic acid, and 611 ml. of water were heated under reflux for 5 hours. To the resulting homogeneous medium was added 319 ml. of concentrated hydrochloric acid and heating thereafter was continued for 5 minutes. The reaction mixture was poured over 5 liters of ice and extracted with ether 3 times. The ether solutions were combined, washed with aqueous sodium bicarbonate and then dried over sodium sulfate. Thereafter the ether was removed, leaving 149 grams of a yellow oil. Distillation of the oil under reduced pressure gave 118 grams of the aldehyde having a boiling point of 113–116° C. at 0.4 mm.

EXAMPLE VI

3,5-dichloro-4-ethylamino cinnamic acid

A mixture of 74 grams (.34 mole) of 3,5-dichloro-4-ethylamino benzaldehyde, 83 grams (.80 mole) of malonic acid, 200 ml. of pyridine, and 4 ml. of piperidine was heated on a steam bath for 17 hours and then under reflux for one-half hour. The reaction mixture was then poured into 800 ml. of 6 N hydrochloric acid and cooled. Filtration gave 70 grams of a product. The crude product had a melting point of 154–159° C.

EXAMPLE VII

3,5-dichloro-4-n-butylamino cinnamic acid

A mixture of 105.3 grams (0.423 mole) of 3,5-dichloro-4-n-butylamino benzaldehyde, 103.4 grams (0.995 mole) of malonic acid, 5 ml. of piperidine, and 250 ml. of pyridine was heated on the steam bath for 23 hours, and then heated to reflux for one-half hour. The resulting solution was concentrated to dryness under reduced pressure in a warm water bath at 60° C. To the oil residue was added 300 ml. of water causing the oil to solidify. After filtration and drying 116.9 grams of crude acid was obtained having a melting point of 118–112° C. Crystallization from methanol gave 92.3 grams of product having a melting point of 124–126° C. The yield here was 75.7%. After further purification by again crystallizing the product from methanol, a product was obtained having a melting point of 127–128° C. The product was calculated for $C_{13}H_{15}Cl_2NO_2$, and a carbon, hydrogen and nitrogen analysis run. Results are as follows:

Theoretical (percent): C, 54.18; H, 5.25; N, 4.86. Found (percent): C, 54.15; H, 5.33; N, 4.66.

EXAMPLE VIII

N-(1,1)-dimethylpropynyl-3,5-dichloro-4(n)-butylamino-cinnamide

A mixture containing 14.4 grams (0.05 mole) of 3,5-dichloro-4-n-butylamino cinnamic acid and 5.6 grams (0.055 mole) of triethylamine in 50 ml. of dimethylacetamide was cooled to 0° C. in a Dry Ice-acetone bath. To the stirred mixture was added dropwise over a period of a few minutes a solution of 5.5 grams (0.051 mole) of ethyl chloroformate in 10 ml. of dimethylacetamide. The mixture was stirred for 1 hour over a temperature range of from about 0° C. to about 10° C. Thereafter, there was added dropwise over a period of a few minutes at 0° C. a solution of 8.3 grams (0.1 mole) of 3-amino-3-methyl-butyne. The resultant mixture was then stirred at room temperature for 5 hours and then poured into 300 ml. of water. An oil then separated which was extracted several times with ether and the combined extracts dried over anhydrous magnesium sulfate. After filtration and distillation of the ether there was obtained 18.5 grams of an oily solid. The crude product was crystallized twice from an ethyl alcohol-water mixture to a constant melting point of 100–101° C. 12.0 grams of product (67.8% yield) was obtained:

Calculated for $C_{18}H_{22}Cl_2N_2O$ (percent).—Theoretical: C, 61.16; H, 6.28; N, 7.93. Found (percent): C, 61.45; H, 6.14; N, 8.09.

EXAMPLE IX

N-cyclopropylmethyl-3,5-dichloro-4-(n)-butylamino-cinnamide

Here, a mixture containing 14.4 grams (0.05 mole) of 3,5-dichloro-n-butylaminocinnamic acid and 5.6 grams (0.055 mole) of triethylamine in 50 ml. of dimethylacetamide was cooled to 0° C. in a Dry Ice-acetone bath. To the stirred mixture was added dropwise over a period of a few minutes a solution of 5.5 grams (0.051 mole) of ethyl chloroformate in 10 ml. of dimethylacetamide. The mixture was stirred for 1 hour over a temperature range of 0–10° C. and to it was then added dropwise over a period of a few minutes at 0° C. a solution of 7.2 grams (0.10 mole) of cyclopropylmethylamine. The resultant mixture was then stirred at room temperature for 2 hours and then poured into 300 ml. of water. The oil that separated solidified upon cooling and scratching of the beaker. After filtration and washing with water 14.6 grams of product was obtained having a melting point of 76–78° C. The crude product was crystallized from 3 N ethyl alcohol-water, with the crystallized product having a melting point of 81–83° C. A second crystallization from a mixture of benzene and Skellysolve B yielded a product having a melting point of 82–83° C. 21.14 grams of final product was obtained in a yield of 72.5%.

The product was then analyzed and calculated for $C_{17}H_{22}Cl_2N_2O$.

Theoretical (percent): C, 59.82; H, 6.50; N, 8.21. Found (percent): C, 59.67; H, 6.65; N, 8.02.

A number of other cinnamides were prepared in accordance with the techniques following in the above examples. In addition, other intermediates or precursors of differing cinnamides were prepared. The structure of these compounds and their physical constants are given in Table I below.

TABLE I

| Example No. | Compound formula | B.P. or M.P., °C. | Empirical formula | Calculated C | Calculated H | Calculated N | Found C | Found H | Found N |
|---|---|---|---|---|---|---|---|---|---|
| 10 | CH$_3$HN—(2,6-Cl$_2$-C$_6$H$_2$)—CH$_2$OH | B.P. 139–141/0.9 mm | C$_8$H$_9$Cl$_2$NO | 46.62 | 4.46 | 6.80 | 46.78 | 4.45 | 7.00 |
| 11 | CH$_3$(CH$_2$)$_3$HN—(2,6-Cl$_2$-C$_6$H$_2$)—CH$_2$OH | B.P. 158/.5 mm | C$_{11}$H$_{15}$Cl$_2$NO | 53.24 | 6.09 | 5.65 | 53.03 | 6.32 | 5.78 |
| 12 | CH$_3$(CH$_2$)$_3$HN—(2,6-Cl$_2$-C$_6$H$_2$)—CHO | B.P. 131/.3 mm | C$_{11}$H$_{13}$Cl$_2$NO | 53.67 | 5.32 | 5.69 | 53.40 | 5.39 | 5.46 |
| 13 | CH$_3$HN—(2,6-Cl$_2$-C$_6$H$_2$)—CH=CHCOOH | M.P. 158–159 | C$_{10}$H$_9$Cl$_2$NO$_2$ | 48.80 | 3.69 | 5.69 | 48.69 | 3.95 | 5.56 |

CH$_3$—CH$_2$—NH—(2,6-Cl$_2$-C$_6$H$_2$)—CH=CH—C(=O)—NR'R

| Example No. | R' | R | B.P. or M.P., °C. | Empirical formula | Calculated C | Calculated H | Calculated N | Found C | Found H | Found N |
|---|---|---|---|---|---|---|---|---|---|---|
| 14 | H | H | M.P. 138–140 | C$_{11}$H$_{12}$Cl$_2$N$_2$O | 50.99 | 4.67 | 10.81 | 50.99 | 4.71 | 10.93 |
| 15 | H | —C(CH$_3$)$_2$—C≡C—H | M.P. 126–130 | C$_{16}$H$_{18}$Cl$_2$N$_2$O | 59.09 | 5.58 | 8.61 | 58.90 | 5.65 | 8.65 |
| 16 | H | —CH$_2$—CH$_2$—CH$_3$ | M.P. 98–99 | C$_{14}$H$_{18}$Cl$_2$N$_2$O | 55.83 | 6.02 | 9.30 | 55.97 | 6.11 | 9.45 |
| 17 | H | cyclopropyl | M.P. 169–171 | C$_{14}$H$_{16}$Cl$_2$N$_2$O | 56.20 | 5.39 | 9.36 | 55.91 | 5.39 | 9.39 |
| 18 | H | —CH$_2$—cyclopropyl | M.P. 127–130 | C$_{15}$H$_{18}$Cl$_2$N$_2$O | 57.52 | 5.79 | 8.94 | 57.58 | 5.88 | 9.16 |

CH$_3$—CH$_2$—CH$_2$NH—(2,6-Cl$_2$-C$_6$H$_2$)—CH=CH—C(=O)—NR'R

| Example No. | R' | R | B.P. or M.P., °C. | Empirical formula | Calculated C | Calculated H | Calculated N | Found C | Found H | Found N |
|---|---|---|---|---|---|---|---|---|---|---|
| 19 | H | H | M.P. 109–111 | C$_{12}$H$_{14}$Cl$_2$N$_2$O | 52.76 | 5.17 | 10.26 | 52.93 | 5.24 | 10.26 |
| 20 | H | —C(CH$_3$)$_2$—C≡C—H | M.P. 117–118 | C$_{17}$H$_{20}$Cl$_2$N$_2$O | 60.19 | 5.94 | 8.26 | 60.10 | 5.81 | 8.07 |
| 21 | H | —CH$_2$—CH$_2$—CH$_3$ | M.P. 100–101 | C$_{15}$H$_{20}$Cl$_2$N$_2$O | 57.15 | 6.39 | 8.89 | 57.38 | 6.54 | 8.98 |
| 22 | H | cyclopropyl | M.P. 143–144 | C$_{15}$H$_{18}$Cl$_2$N$_2$O | 57.52 | 5.79 | 8.94 | 57.44 | 5.95 | 9.09 |
| 23 | H | —CH$_2$—cyclopropyl | M.P. 97–99 | C$_{16}$H$_{20}$Cl$_2$N$_2$O | 58.72 | 6.16 | 8.56 | 58.94 | 6.31 | 8.59 |
| 24 | CH$_3$—CH$_2$—CH$_2$—NH—(2,6-Cl$_2$-C$_6$H$_2$)—CH$_2$OH | | B.P. 150–151/1.3 mm | C$_{10}$H$_{13}$Cl$_2$NO | 51.30 | 5.60 | 5.98 | 51.40 | 5.85 | 6.23 |

TABLE I—Continued

| Example No. | Compound formula | B.P. or M.P., °C. | Empirical formula | Calculated C | Calculated H | Calculated N | Found C | Found H | Found N |
|---|---|---|---|---|---|---|---|---|---|
| 25 | $CH_3CH_2CH_2-NH-\underset{Cl}{\overset{Cl}{C_6H_2}}-CHO$ | B.P. 136–138/1.0 mm | $C_{10}H_{11}Cl_2NO$ | 51.75 | 4.78 | 6.03 | 51.92 | 4.80 | 6.23 |
| 26 | $CH_3-CH_2-CH_2-NH-\underset{Cl}{\overset{Cl}{C_6H_2}}-CH=CH-\overset{O}{C}-OH$ | M.P. 134–138 | $C_{12}H_{13}Cl_2NO_2$ | 52.57 | 4.78 | 5.11 | 52.73 | 4.95 | 5.31 |

$CH_3(CH_2)_3HN-\underset{Cl}{\overset{Cl}{C_6H_2}}-CH=CH\overset{O}{C}-R$

| Example No. | R | B.P. or M.P., °C. | Empirical formula | Calculated C | Calculated H | Calculated N | Found C | Found H | Found N |
|---|---|---|---|---|---|---|---|---|---|
| 27 | $-NHCH_2CH_2CH_3$ | M.P. 80–81 | $C_{16}H_{22}Cl_2N_2O$ | 58.36 | 6.74 | 8.51 | 58.34 | 6.93 | 8.36 |
| 28 | $-NH_2$ | M.P. 128–129 | $C_{13}H_{16}Cl_2N_2O$ | 54.36 | 5.62 | 9.76 | 54.27 | 5.45 | 9.82 |
| 29 | $-NH-\triangleleft$ | M.P. 122–123 | $C_{16}H_{19}Cl_2N_2O$ | 58.72 | 6.16 | 8.56 | 59.13 | 6.13 | 8.74 |
| 30 | $-NHCH_2-\triangleleft$ | M.P. 82–83 | $C_{17}H_{22}Cl_2N_2O$ | 59.82 | 6.50 | 8.4 | 59.67 | 6.65 | 8.02 |
| 31 | $-NH\underset{CH_3}{\overset{CH_3}{C}}C\equiv CH$ | M.P. 100–101 | $C_{18}H_{22}Cl_2N_2O$ | 61.16 | 6.28 | 7.93 | 61.45 | 6.14 | 8.09 |
| 32 | $-OH$ | M.P. 127–128 | $C_{13}H_{15}Cl_2NO_2$ | 54.18 | 5.25 | 4.86 | 54.15 | 5.33 | 4.66 |

$CH_3NH-\underset{Cl}{\overset{Cl}{C_6H_2}}-CH=CH\overset{O}{C}-R$

| Example No. | R | B.P. or M.P., °C. | Empirical formula | Calculated C | Calculated H | Calculated N | Found C | Found H | Found N |
|---|---|---|---|---|---|---|---|---|---|
| 33 | $-NHCH_2CH_2CH_3$ | M.P. 103–104 | $C_{13}H_{16}Cl_2N_2O$ | 54.36 | 5.62 | 9.76 | 54.23 | 5.88 | 9.68 |
| 34 | $-NH_2$ | M.P. 122–123 | $C_{10}H_{10}Cl_2N_2O$ | 49.00 | 4.11 | 11.43 | 49.13 | 4.41 | 11.57 |
| 35 | $-OH$ | M.P. 159–160 | $C_{10}H_9Cl_2NO_2$ | 48.80 | 3.69 | 5.69 | 48.69 | 3.95 | 5.56 |
| 36 | $CH_3NH-\underset{Cl}{\overset{Cl}{C_6H_2}}-\overset{O}{C}-OH$ | M.P. 196–197 | $C_8H_7Cl_2NO_2$ | 43.67 | 3.20 | 6.36 | 43.72 | 3.01 | 6.92 |
| 37 | $CH_3CH_2NH-\underset{Cl}{\overset{Cl}{C_6H_2}}-\overset{O}{C}-OH$ | M.P. 159–160 | $C_9H_9Cl_2NO_2$ | 46.17 | 3.88 | 5.98 | 46.04 | 3.84 | 6.00 |
| 38 | $CH_3CH_2CH_2NH-\underset{Cl}{\overset{Cl}{C_6H_2}}-\overset{O}{C}-OH$ | M.P. 125–127 | $C_{10}H_{11}Cl_2NO_2$ | 48.41 | 4.47 | 5.65 | 48.40 | 4.52 | 5.68 |
| 39 | $CH_3CH_2CH_2CH_2NH-\underset{Cl}{\overset{Cl}{C_6H_2}}-\overset{O}{C}-OH$ | M.P. 119–120 | $C_{11}H_{13}Cl_2NO_2$ | 50.40 | 5.00 | 5.34 | 50.31 | 5.12 | 5.39 |
| 40 | $CH_3NH-\underset{Cl}{\overset{Cl}{C_6H_2}}-\overset{O}{C}-OCH_3$ | M.P. 77–78 | $C_9H_9Cl_2NO_2$ | 46.17 | 3.87 | 5.99 | 46.43 | 4.16 | 6.13 |

TABLE I—Continued

| Example No. | Compound formula | B.P. or M.P., °C. | Empirical formula | Calculated C | Calculated H | Calculated N | Found C | Found H | Found N |
|---|---|---|---|---|---|---|---|---|---|
| 41 | CH₃NH—(3,5-Cl₂-C₆H₂)—C(O)—OCH₂CH₃ | | $C_{10}H_{11}Cl_2NO_2$ | | | | | | |
| 42 | CH₃CH₂NH—(3,5-Cl₂-C₆H₂)—C(O)—OCH₃ | B.P. 119–121/0.28 mm | $C_{10}H_{13}Cl_2NO_2$ | | 5.64 | | | 5.51 | |
| 43 | CH₃CH₂CH₂NH—(3,5-Cl₂-C₆H₂)—C(O)—OCH₃ | B.P. 134–135/0.6 mm | $C_{11}H_{13}Cl_2NO_2$ | | 5.34 | | | 5.15 | |
| 44 | CH₃CH₂CH₂CH₂NH—(3,5-Cl₂-C₆H₂)—C(O)—OCH₃ | B.P. 131–132/0.11 mm | $C_{12}H_{15}Cl_2NO_2$ | 52.18 | 5.47 | 5.07 | 52.26 | 5.69 | 5.09 |

A number of representative compounds shown above were then tested for their anti-depressant activity. Specifically, the modified dopa-test described by G. M. Everett et al., Proc. 1st Int. Symp. Anti-Depressant Drugs, p. 164 (1966), was utilized. This modified dopa-test is based on the following. When dl-dopa is given to untreated mice, no response occurs because of the inactivation of the dopa by endogenous monamine oxidase. However, if mice are pre-treated with a monamine oxidase inhibitor, such as via an oral administration of 40 mg./kg. of paragyline hydrochloride and then given 200 mg./kg. of dl-dopa orally, along with a known anti-depressant, the mice showed maximum motor reaction, violent activity, jumping and fighting. Known anti-depressant such as imipramine and amitryptyline are extremely effective agents in potentiating the dopa response in mice. Thus, the modified dopa-test has been found to be unusually sensitive and reliable in evaluating the anti-depressant activity of potential drugs.

Those compounds having the following structural formula:

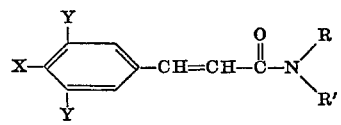

where X, R and R' have the meanings as indicated above were then tested at various dosages using the just described test procedure. The drugs were administered orally. The effectiveness of the drugs was evaluated after 4 hours time following administration, and given ratings of 1 (slight activity), 2 (moderate activity) or 3 (marked activity). As is evident from the results below in Table II the novel compounds of the invention show good anti-depressant activity.

TABLE II

| Compound number | X | R | R' | Dosage, mg./kg. | Rating |
|---|---|---|---|---|---|
| 1 | CH₃CH₂CH₂CH₂NH— | H | —CH₂—cyclopropyl | 100 | 2 |
| 2 | CH₃CH₂CH₂CH₂NH— | H | —cyclopropyl | 25 | 2 |
| 3 | CH₃CH₂CH₂NH— | H | H | 100 | 2 |
| 4 | CH₃CH₂NH— | H | —CH₂—cyclopropyl | 100 | 2 |
| 5 | CH₃CH₂NH— | H | —C(CH₃)₂—C≡CH | 100 | 3 |
| 6 | CH₃CH₂NH— | H | —CH₂CH₂CH₃ | 25 | 3 |
| 7 | CH₃CH₂NH— | H | —cyclopropyl | 100 | 2 |
| 8 | NH₂ | H | —C(CH₃)₂—C≡CH | 100 | 2 |
| 8 | NH₂ | H | Same as above | 25 | 2 |
| 8 | NH₂ | H | Do | 25 | 2 |

What is claimed is:
1. A compound of the formula

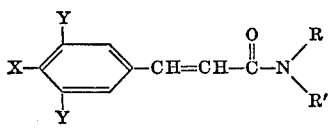

where X is selected from the group consisting of $NH_2$, NH—loweralkyl and N(loweralkyl)$_2$; each Y is a halogen selected from the group consisting of chlorine, bromine, fluorine and iodine; each R and R' are radicals selected from the group consisting of hydrogen, alkyl containing 8 or less carbon atoms, alkenyl containing 8 or less carbon atoms, cyclopropyl, and cyclopropylmethyl; and a pharmaceutically acceptable addition salt thereof.
2. A compound of claim 1 where X is NH—loweralkyl.
3. A compound of claim 1 where Y is chloro.
4. A compound of claim 3 where X is methylamino.
5. A compound of claim 3 where X is ethylamino.
6. A compound of claim 3 where X is propylamino.
7. A compound of claim 3 where X is butylamino.
8. A compound of claim 2 where R and R' are hydrogen.
9. A compound of claim 2 where R is hydrogen and R' is 2-methyl-butynyl.
10. A compound of claim 2 where R is hydrogen and R' is n-propyl.
11. A compound of claim 2 where R is hydrogen and R' is cyclopropyl.
12. A compound of claim 2 where R is hydrogen and R' is cyclopropylmethyl.

References Cited
UNITED STATES PATENTS
3,488,749   1/1970   Loeu et al. _____ 260—558

HARRY I. MOATZ, Primary Examiner

U.S. Cl. X.R.

260—250 R, 247.5 R, 293.8, 307 A, 309, 309.2, 326.5 J, 518 A, 574, 575, 577, 578; 424—250, 248, 267, 272, 273, 274, 324

UNITED STATES PATENT OFFICE
CERTIFICATE OF CORRECTION

Patent No. 3,801,636               Dated April 2, 1974

Inventor(s) Bruce Wayne Horrom

It is certified that error appears in the above-identified patent and that said Letters Patent are hereby corrected as shown below:

In Column 10, last number in line 37, please delete "6.00" and substitute therefor, "6.08".

In Column 10, last number in line 38, please delete "5.68 and substitute therefor, "5.60".

Signed and sealed this 10th day of September 1974.

(SEAL)
Attest:

McCOY M. GIBSON, JR.                C. MARSHALL DANN
Attesting Officer                   Commissioner of Patents